(12) United States Patent
Bradley

(10) Patent No.: US 8,938,412 B2
(45) Date of Patent: Jan. 20, 2015

(54) RESOURCE COMMUNITY TOPIC MODELING WITH SPREADING ACTIVATION

(75) Inventor: Ray Matthew Bradley, Miami, FL (US)

(73) Assignee: Infotech Soft, Inc., Miami, FL (US)

( * ) Notice: Subject to any disclaimer, the term of this patent is extended or adjusted under 35 U.S.C. 154(b) by 0 days.

(21) Appl. No.: 13/464,227

(22) Filed: May 4, 2012

(65) Prior Publication Data
US 2014/0046894 A1   Feb. 13, 2014

(51) Int. Cl.
*G06F 9/44*   (2006.01)
*G06N 7/02*   (2006.01)
*G06N 7/06*   (2006.01)
*G06N 5/02*   (2006.01)

(52) U.S. Cl.
CPC .......................................... *G06N 5/02* (2013.01)
USPC ............................................................ 706/52

(58) Field of Classification Search
None
See application file for complete search history.

(56) References Cited

U.S. PATENT DOCUMENTS

| | | | |
|---|---|---|---|
| 8,108,389 B2* | 1/2012 | Bobick et al. | 707/736 |
| 2008/0016020 A1* | 1/2008 | Estes | 706/52 |
| 2011/0004463 A1* | 1/2011 | Gryc et al. | 704/9 |
| 2011/0238608 A1* | 9/2011 | Sathish | 706/47 |

* cited by examiner

*Primary Examiner* — Kakali Chaki
*Assistant Examiner* — Luis Sitiriche
(74) *Attorney, Agent, or Firm* — Mark Terry

(57) ABSTRACT

The present invention relates to computer implemented methods and system for determining relevance measures for computational resources based on their relatedness to a user's interests. The methods and systems are designed to accept as inputs a collection of unstructured textual data related to resources, and a structured graph of the relationships between resources, to calculate probability distributions of resources over latent communities discovered from the unstructured textual data, to activate the structured graph with these probability distributions, and to spread this activation throughout the graph in a fixed number of iterations. The result of these methods and of the systems implementing these methods is a set of relevance measures attached to the resources in the structured graph.

3 Claims, 2 Drawing Sheets

RESOURCE COMMUNITY TOPIC MODELING WITH SPREADING ACTIVATION

STATEMENT REGARDING FEDERALLY SPONSORED RESEARCH OR DEVELOPMENT

This invention was made with government support under R43RR018667 and R43CA132293 awarded by the National Institutes of Health (NIH). The government has certain rights in the invention.

FIELD OF THE INVENTION

The present invention generally relates to the search for computational resources within an interconnected network. More particularly, the present invention relates to computer implemented methods and systems to attach a relevance measure to computational resources based on their relatedness to a user's interests, using the statistical machine learning technique known as topic modeling.

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

In the context of this application, a resource is defined as any entity represented through some textual description within a computational environment. Since any entity can be so described, the universe of possible resources comprises the universe of all possible entities, including such computational resources as databases and other data sources; queries against databases; publications, webpages, and other textual entities; and people.

Entity ranking refers to the assignment of a relevance value to related objects and entities from different sources. For the search of experts in particular, multiple techniques have been used for this purpose, including probabilistic models and graph-based approaches. Probabilistic models measure associations between experts by detecting their probability distributions with respect to resources such as documents. Graph-based models utilize predefined interconnections between entities to uncover associations.

Topic modeling is a probabilistic generative process designed to uncover the semantics of a collection of documents using a hierarchical Bayesian analysis. The objective of topic modeling is to estimate a probabilistic model of a corpus of documents that assigns high probability to the members of the corpus and also to other "similar" documents. The initial development of topic models conceptualized topics as probabilistic distributions over the words in independent documents. Enhancements and modifications to the basic topic model algorithm that have been proposed include the incorporation of authorship information and the use of multi-level topic arrangements, where topics at one level are considered to be distributions of topics at a lower level. None of the currently proposed techniques, however, combine the ability to model distributions of topics, which we call communities, with the use of authorship information in order to generate authors as distributions over communities. Moreover, the models using authorship information use the concept of "authorship" literally, requiring an author over a piece of text, and do not allow for the use of other structural relationships between resources, such as the textual description of a data source.

Spreading activation is a theory first proposed to model the retrieval characteristics of human memory; it postulates that cognitive units form an interconnected network, and that retrieval is achieved through the spread of activation throughout this network. In recent years, this theory has been successfully applied as a method for associative retrieval in graph-based computer applications.

Most entity ranking approaches concentrate either on the use of probabilistic models over unstructured textual contents, typically using the relationship between experts and their publications, or on the use of graph-theoretic approaches over some predetermined relationships between entities. It seems clear that to achieve better accuracy on relevance rankings with respect to user expectations, it is necessary to combine both the unstructured and structured information within a single framework, and to enable the modeling of communities of resources. Accordingly, it is desirable to derive systems and methods that fulfill these characteristics and that overcome existing deficiencies in the state of the art.

SUMMARY OF THE INVENTION

In accordance with the present invention, computer implemented methods and systems are provided for determining relevance measures for computational resources based on their relatedness to a user's interests.

In accordance with some embodiments of the present invention, in response to receiving a structured graph of interconnections between resources and a set of unstructured textual data attached to these resources, calculations are performed to define the relatedness of each of the resources in the graph to the user performing the search. In some embodiments, an additional input consisting of keywords is also provided, to guide the search results. The calculations consist in the discovery of latent topics as probability distributions over words, of latent communities as probability distributions over topics, of the probability distribution of resources over communities, and of the relevance ranking based on these distributions. In some embodiments, these distributions are subsequently processed by spreading activation over the structural graph of resources, deriving a final relevance ranking.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and its various advantages, will be more apparent upon consideration of the following detailed description, taken in conjunction with the accompanying drawings, in which like reference characters refer to like parts throughout, and in which.

DETAILED DESCRIPTION OF THE INVENTION

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

Figure 1:
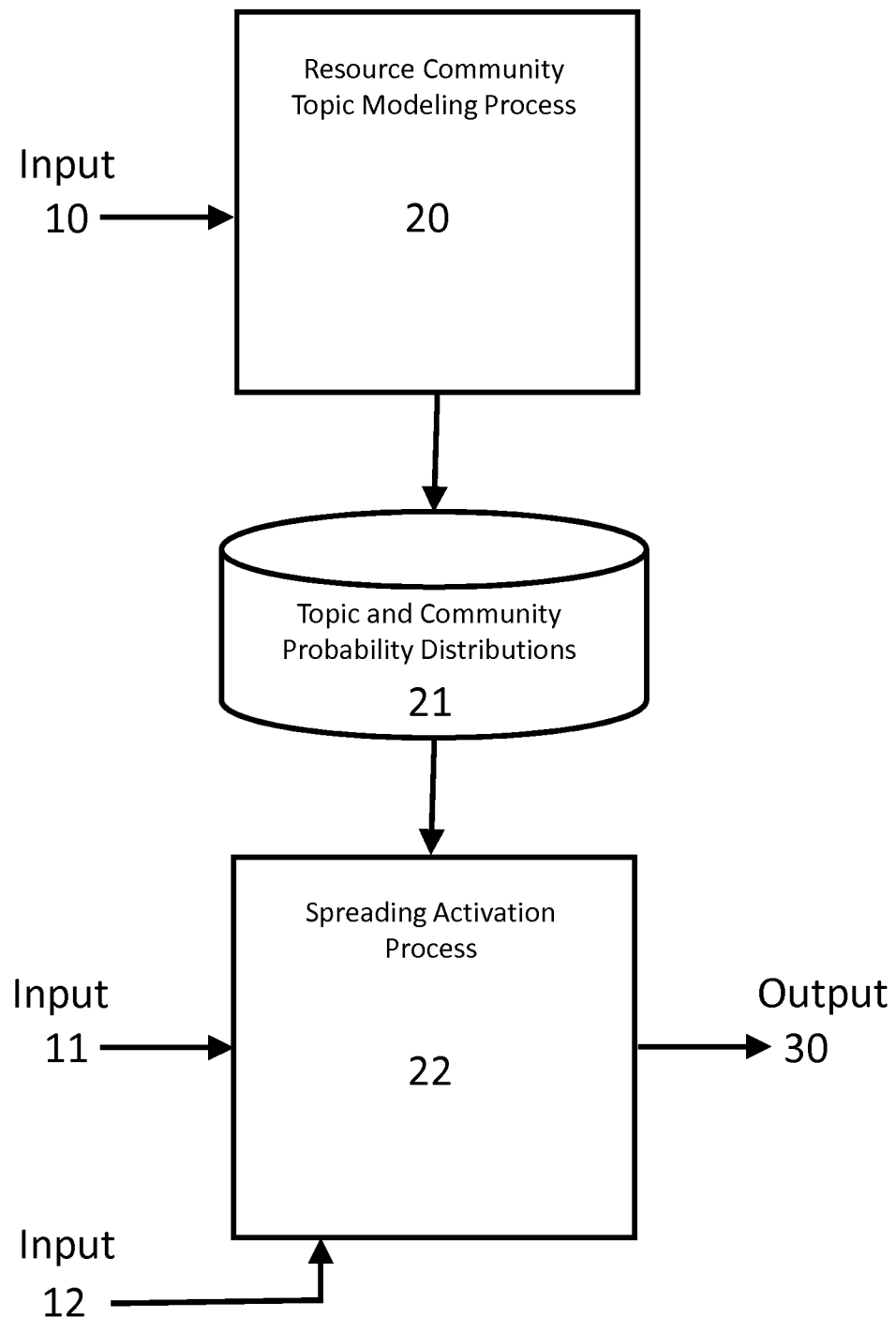
FIG. 1 is a simplified illustration of the process for calculation of relevance measures from a graph of structural connections between resources, and from a set of unstructured texts associated with these resources.

FIG. 1 is an illustration of the process matter of this patent application, which shows inputs 10 and 11, processes 20 and 22, intermediate results 21, and output 30. Input 10 is a set of unstructured text documents associated with resources. Input 11 is a structured graph of resources interconnected with each other through various relations, henceforth called SG. Input 12 is a set of keywords. Process 20 is the resource community topic modeling process, which uses input 10 to produce a set of topic and community probability distributions labeled as 21. Process 22 is a spreading activation process that uses inputs 11 and 12, and intermediate results 21, in order to produce a set of relevance measures for resources. This set of relevance measures is the output of the process, labeled 30.

Resource Community Topic Model

Figure 2:
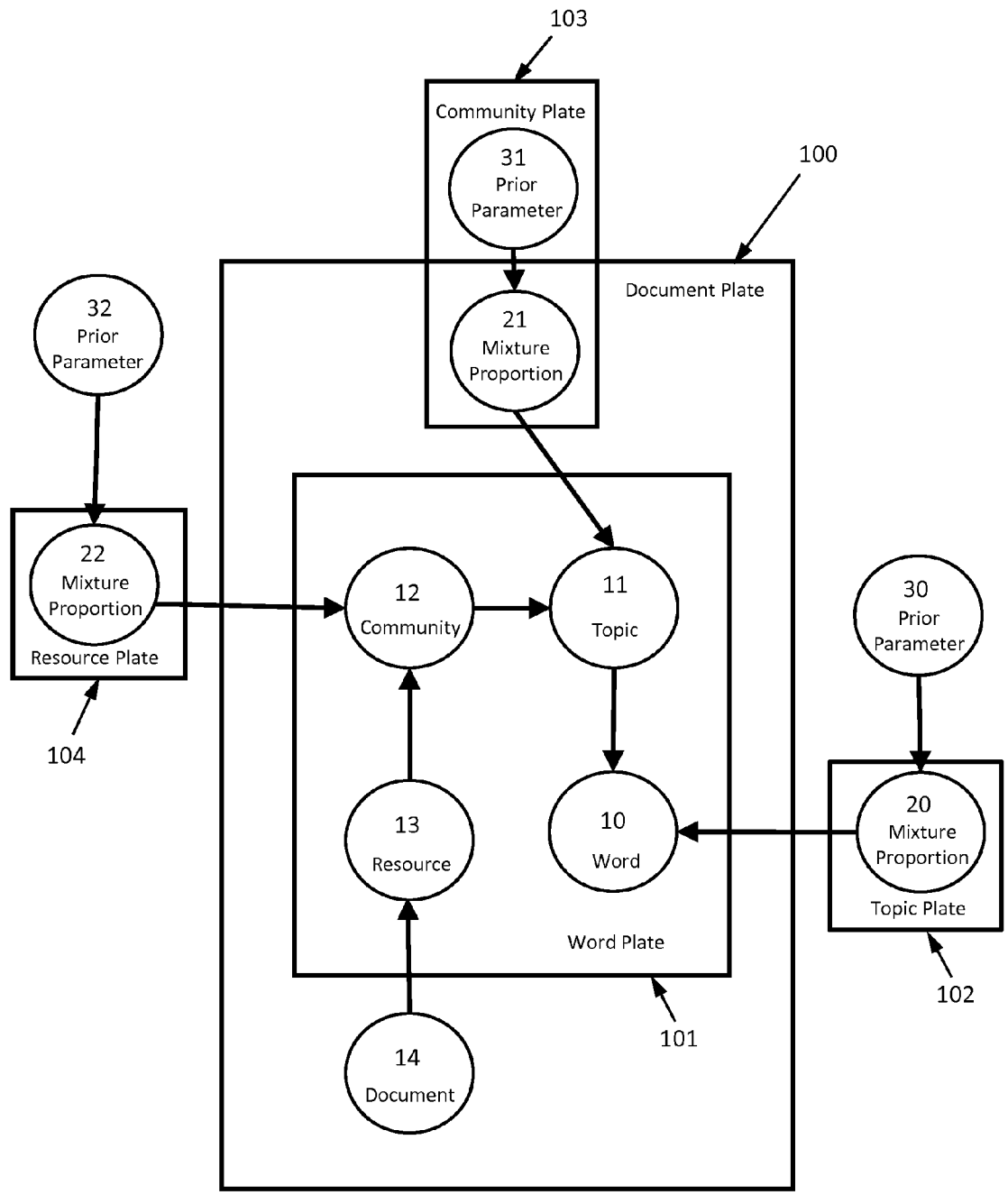
FIG. 2 is an illustration of the resource community topic modeling algorithm, using standard plate notation.

The resource community topic model is defined by the Bayesian network depicted in plate notation in FIG. 2. Here, plate 100 denotes the "document plate," which represents a single document; plate 101 denotes the "word plate," representing each word in a document, plate 102 denotes the "topic plate," representing each latent topic, plate 103 denotes the "community plate," representing each latent community, and plate 104 denotes the "resource plate," representing every resource. The resource community topic model is a generative process that performs as follows:

The set of resources associated with each document, labeled as 14, generates a single resource r, labeled as 13, from a uniform probability distribution.

From resource r, a community c, labeled as 12, is generated based on a mixture proportion $\Psi=P(c|r)$, labeled as 22. The mixture proportion $\Psi$ is modeled as a multinomial distribution with a Dirichlet prior distribution $P(\Psi)=\text{Dir}(\gamma)$. The prior parameter $\gamma$ is labeled 32.

From community c, a topic z, labeled as 11, is generated based on a mixture proportion $\theta=P(z|)$, labeled as 21. The mixture proportion $\theta$ is modeled as a multinomial distribution with a Dirichlet prior distribution $P(\theta)=\text{Dir}(\gamma)$. The prior parameter $\alpha$ is labeled 31.

From topic z, a word w, labeled as 10, is generated based on a mixture proportion $\Phi=P(w|z)$, labeled as 20. The mixture proportion $\Phi$ is modeled as a multinomial distribution with a Dirichlet prior distribution $P(\Phi)=\text{Dir}(\beta)$. The prior parameter $\beta$ is labeled 30.

The complete likelihood of generating the corpus, i.e., the joint distribution of all known and hidden variables, given the parameters, is specified by:

$$P(D, Z, C, R, \psi, \theta, \phi \mid \alpha, \beta, \gamma) = \left( \prod_{w_i \in W} P(w_i \mid \phi) P(z_j \mid \theta) P(c_k \mid \psi) P(r_m) \cdot P(\theta \mid \alpha) \right) P(\phi \mid \beta) \cdot P(\psi \mid \gamma) \quad (1)$$

where $z_j$, $c_k$, and $r_m$ are indicators that choose a topic, community, and resource for every word $w_i$, and $\Phi$, $\theta$, and $\Psi$ are vectors containing all the values for $\Phi$, $\theta$, and $\Psi$ for every $w_i$, $z_j$, and $c_k$. Integrating out $\Phi$, $\partial$, and $\Psi$, and summing over $z_j$, $c_k$, and $r_m$, we obtain $$P(D \mid \alpha, \beta, \gamma) = \int\int\int \left( \prod_{w_i \in W^d} \sum_{r_m=R} \sum_{c_k=C} \sum_{z_j=Z} P(w_i \mid \phi) P(z_j \mid \theta) P(c_k \mid \psi) P(r_m) P(\theta \mid \alpha) \right) P(\phi \mid \beta) P(\psi \mid \gamma) d\psi d\theta d\phi \quad (2)$$

Gibbs Sampling

Exact inference over such a model is generally intractable, as it requires summing over all possible researcher, community and topic assignments. To avoid this, we use Gibbs Sampling, a Markov Chain Monte Carlo algorithm that provides a good approximate inference for high dimensional models while using relatively simple processes. We construct a Markov chain that converges to the posterior distribution over the latent variables r, c, and z conditioned on D, $\alpha$, $\beta$, $\gamma$, and R. Let us denote the assignment of resources, communities and topics to words other than $w_i$ as $R_{-i}$, $C_{-i}$, and $Z_{-i}$ respectively, The Gibbs sampling update equation calculates the probability of assignment to $r_m$, $c_k$, and $z_j$ given $w_i$, and given the set of assignments to the other words as:

$$P(r=r_m, c=c_k, z=z_j \mid w=w_i, R_{-i}, C_{-i}, Z_{-i}, W_{-i}) \propto P(w=w_i \mid W_{-i}, z=z_j, Z_{-i}) P(z=z_j \mid Z_{-i}, c=c_k, C_{-i}) (c=c_k \mid C_{-i}, r=r_m, R_{-i}) \quad (3)$$

since the distributions W, Z, C, and R are assumed conditionally independent. Note that because the distribution over resources is uniform, P(r) is constant and can be obviated from the proportionality. Each of the terms in the right hand side of equation (3) is an estimate of the random variables $\theta$, $\Psi$, and $\Phi$:

$$\phi_{ij} \sim P(w = w_i \mid W_{-i}, z = z_j, Z_{-i}) \propto \frac{n_{j,-i}^{WZ} + \beta_{ij}}{\sum_{W_{-i}} n_w^{WZ} + \sum_{W_{-i}} \beta_{wj}} \quad (4)$$

$$\theta_{jk} \sim P(z = z_j \mid Z_{-i}, c = c_k, C_{-i}) \propto \frac{n_{k,-j}^{ZC} + \alpha_{jk}}{\sum_{Z_{-i}} n_z^{ZC} + \sum_{Z_{-i}} \alpha_{zk}} \quad (5)$$

$$\psi_{km} \sim P(c = c_k \mid C_{-i}, r = r_m, R_{-i}) \propto \frac{n_{m,-k}^{CR} + \gamma_{km}}{\sum_{C_{-i}} n_c^{CR} + \sum_{C_{-i}} \gamma_{cm}} \quad (6)$$

where $n_{j,-i}^{wz}$ is the number of times word $w_i$ was sampled from topic $z_j$, $n_{k,-j}^{ZC}$ is the number of times topic $z_j$ was sampled from community $c_k$, and $n_{k,-m}^{CR}$ is the number of times community s was sampled from researcher $r_m$, all of them excluding the current sample. The summations of counts $n_w^{WZ}$, $n_z^{ZC}$, and $n_c^{CR}$, and of parameters $\beta_{wj}$, $\alpha_{zk}$, and $\gamma_{cm}$ in the denominators are over the universe of words, topics, and documents respectively, again excluding the current assignment.

Moment Matching

Uniform Dirichlet parameters are used for β and γ, as they represent only a prior statement on the sparseness of the φ and ψ distributions, and since it has been demonstrated that there is no significant benefit of learning these parameters when applied to information retrieval. The α parameters must capture the different correlations among topics, and therefore are not assumed uniform. To estimate their values we apply moment matching as follows:

$$\mu_{jk} = \frac{1}{n_k + 1} \left( \sum_{d \in D} \frac{n_{jk}^{ZC}}{n_{kd}} + \frac{1}{|C|} \right) \quad (7)$$

$$\sigma_{jk} = \frac{1}{n_k + 1} \left( \sum_{d \in D} \left( \frac{n_{jk}^{ZC}}{n_{kd}} - \mu_{jk} \right)^2 + \left( \frac{1}{|C|} - \mu_{jk} \right)^2 \right) \quad (8)$$

$$m_{jk} = \frac{\mu_{jk}(1 - \mu_{jk})}{\sigma_{jk}} - 1 \quad (9)$$

$$\alpha_{jk} = \frac{\mu_{jk} e^{|Z|}}{\sum_Z \log(m_{jk})} \quad (10)$$

where $n_{jk}^{ZC}$ is as before, $n_k$ is the total number that community $c_k$ has been sampled, $n_{kd}$ is the total number that $c_k$ has been sampled for a given document, |C| is the total number of communities, and |Z| is the total number of topics. The moment matching procedure calculates the mean $\mu_{jk}$, variance $\sigma_{jk}$, and moment $m_{jk}$ for a pair of topic $Z_j$ and community $c_k$, and from these values it estimates each hyperparameter $\alpha_{jk}$.

The Gibbs sampling algorithm runs the Markov chain until convergence. After a burn-in period used to eliminate the influence of initialization parameters, a resource, community, and topic assignment is generated for each word in the corpus using the probability distributions estimated up to that point. This collection of generated values, called a Gibbs state, is then used to update the estimators with equations (4)-(6) and the Dirichlet prior α with moment matching.

Spreading Activation

Spreading activation is applied over the probability distributions obtained through the resource community topic model using a breadth first search of the SG. An Activation State (AS) is a mapping from nodes in the SG to activation levels, AS: N→R. To form semantic clusters for a community, the algorithm first initializes the AS according to the community's distribution over topics, by utilizing named entity recognition to relate entities in the SG to words in the topic models, augmented with words from natural language statements provided by users as guiding terms for discovery. It then computes the probability for each entity y conditioned on the specified community:

$$P(y \mid c = c_k) = \sum_{z_j \in Z} (\theta_{ij} \psi_{jk}) \quad (11)$$

and sets the activation level of the top-k entities to their corresponding probability. Activation is then spread over the linked data network from the initially activated nodes through multiple iterations, computing activation levels for each node as:

$$I_i = \sum_j a_j \frac{g_t}{n_j} \quad (12)$$

$$O_i = a_i + \lambda_i s(I_i) \quad (13)$$

$$s(x) = \frac{1 - e^{-\alpha x}}{1 + e^{-\alpha x}} \quad (14)$$

$$a_{i+1} = \begin{cases} O_i, & O_i \geq h \\ 0, & O_i < h \end{cases} \quad (15)$$

where $I_i$ is the input, $\alpha_i$ is the current activation, and $O_j$ is the output activation of node i, $g_t$ is a gain factor based on the relationship type, $n_i$ is the number of outgoing connections of type t from node i, $\lambda_i$ is an efficiency factor, and h is a threshold. The sigmoid function s(x) ensures a maximum input activation of one, and also attenuates small activation levels, to avoid runaway activation. The set of $\alpha_{i+1}$ constitutes the current AS. Since we are applying spreading activation for search within a highly connected graph with loops we terminate the algorithm after a set number of iterations. The final AS contains the nodes for the semantic cluster, where the activation level indicates the relevance of the node to the community. Clusters are formed for topics and documents in an analogous manner.

Considerations on Presentation of the Proposed Process

It is understood herein that the detailed description may be presented in terms of program procedures executed on a computer or network of computers. These procedural descriptions and representations are the means used by those skilled in the art to most effectively convey the substance of their work to other skilled in the art.

A procedure is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over a smartphone, the Internet, an Intranet, etc. Either of these may be implemented as a distributed computer system rather than a single computer. Moreover, the processing could be controlled by a software program on one or more computer systems or processors, or could even be partially or wholly implemented in hardware.

Portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C++, or any assembly language appropriate in view of the processor being used. It could also be written in an object-oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method on a computer for calculating the relevance of an author of one or more documents to a community, the method comprising:
   receiving a set of documents associated with one or more authors;
   for a given set of topics, calculating a set of probability distributions of topics over words within the documents, wherein each probability distribution comprises a data structure that defines a probability that a word is present in a topic;
   for a given set of communities, calculating a set of probability distributions of communities over the given set of topics, wherein each probability distribution comprises a data structure that defines a probability that a topic is present in a community;
   for each author of a document, calculating a set of probability distributions over the given set of communities, wherein each probability distribution comprises a data structure that defines a probability that an author takes part in a community;
   calculating a set of probability distributions of resources over the given set of topics for each community, wherein each probability distribution comprises a data structure that defines a probability that a given topic will be included in the document;
   receiving a structured graph of data sources interconnected via one or more links, wherein a structured graph comprises a hierarchy of graphs;
   assigning initial activation states to nodes in the structured graph relative to a probability of the node occurring in each community;
   executing a spreading activation process on the structured graph, thereby producing a data structure that defines a relevance measure for each node within each community; and
   transmitting said relevance measure for each node within each community for display to a user.

2. The method of claim 1, the method further comprising:
   receiving a set of keywords representing a user's interests;
   calculating a relevance measure for each resource according to the user's distribution over communities, and the data structure containing the relevance measures of the nodes within each community;
   returning a ranked list of the most relevant resources based at least in part on the calculated relevance scores; and
   transmitting said ranked list of the most relevant resources for display to a user.

3. A method on a computer for calculating the relevance of an author of one or more documents to a community, the method comprising:
   receiving a set of documents associated with one or more authors;
   for a given set of topics, calculating a set of probability distributions of topics over words within the documents, wherein each probability distribution comprises a data structure that defines a probability that a word is present in a topic;
   for a given set of communities, calculating a set of probability distributions of communities over the given set of topics, wherein each probability distribution comprises a data structure that defines a probability that a topic is present in a community;
   for each author of a document, calculating a set of probability distributions over the given set of communities, wherein each probability distribution comprises a data structure that defines a probability that an author takes part in a community;

calculating a set of probability distributions of resources over the given set of topics for each community, wherein each probability distribution comprises a data structure that defines a probability that a given topic will be included in the document;

receiving a structured graph of data sources interconnected via one or more links, wherein a structured graph comprises a hierarchy of graphs;

assigning initial activation states to nodes in the structured graph relative to a probability of the node occurring in each community;

executing a spreading activation process on the structured graph, thereby producing a data structure that defines a relevance measure for each node within each community;

transmitting said relevance measure for each node within each community for display to a user;

receiving a set of keywords representing a user's interests;

calculating a relevance measure for each resource according to the user's distribution over communities, and the data structure containing the relevance measures of the nodes within each community;

returning a ranked list of the most relevant resources based at least in part on the calculated relevance scores; and transmitting said ranked list of the most relevant resources for display to a user.

\* \* \* \* \*